United States Patent [19]
Blue

[11] 3,818,736
[45] June 25, 1974

[54] TOOTH FORMING MACHINE
[75] Inventor: Donald E. Blue, Decatur, Ill.
[73] Assignee: Caterpillar Tractor Co., Peoria, Ill.
[22] Filed: Oct. 10, 1972
[21] Appl. No.: 296,280

[52] U.S. Cl.......................... 72/88, 72/469, 308/3 A
[51] Int. Cl............................................... B21h 5/00
[58] Field of Search........... 72/88, 90, 469; 308/3 A

[56] References Cited
UNITED STATES PATENTS

| | | | |
|---|---|---|---|
| 440,763 | 11/1890 | Simonds | 72/88 |
| 1,917,926 | 7/1933 | Decker | 308/3 A UX |
| 1,973,201 | 9/1934 | Fassinger | 72/88 |
| 2,930,877 | 3/1960 | Pelphrey | 72/88 X |
| 2,994,237 | 8/1961 | Pelphrey | 72/469 |
| 2,995,964 | 8/1961 | Drader | 72/88 |
| 3,084,572 | 4/1963 | Starck | 72/88 |
| 3,283,559 | 11/1966 | Clerk | 72/469 |
| 3,484,064 | 12/1969 | Koenig | 308/3 R X |

*Primary Examiner*—Milton S. Mehr
*Attorney, Agent, or Firm*—Phillips, Moore, Weissenberger, Lempio & Strabala

[57] ABSTRACT

A tooth forming machine provides an improved method of rolling a plurality of teeth on a rotatably supported cylindrical workpiece. The machine includes a tooth forming die on rack mounted on the powered member in tangential tooth forming relation with the periphery of the workpiece and provides a stepped series of multi-toothed, uniformly profiled forming sections which afford gradually decreasing penetration levels into the workpiece. The rack is movably supported by a machine slide assembly including a plurality of springbiased bearing plates for maintaining alignment of the rack.

5 Claims, 7 Drawing Figures

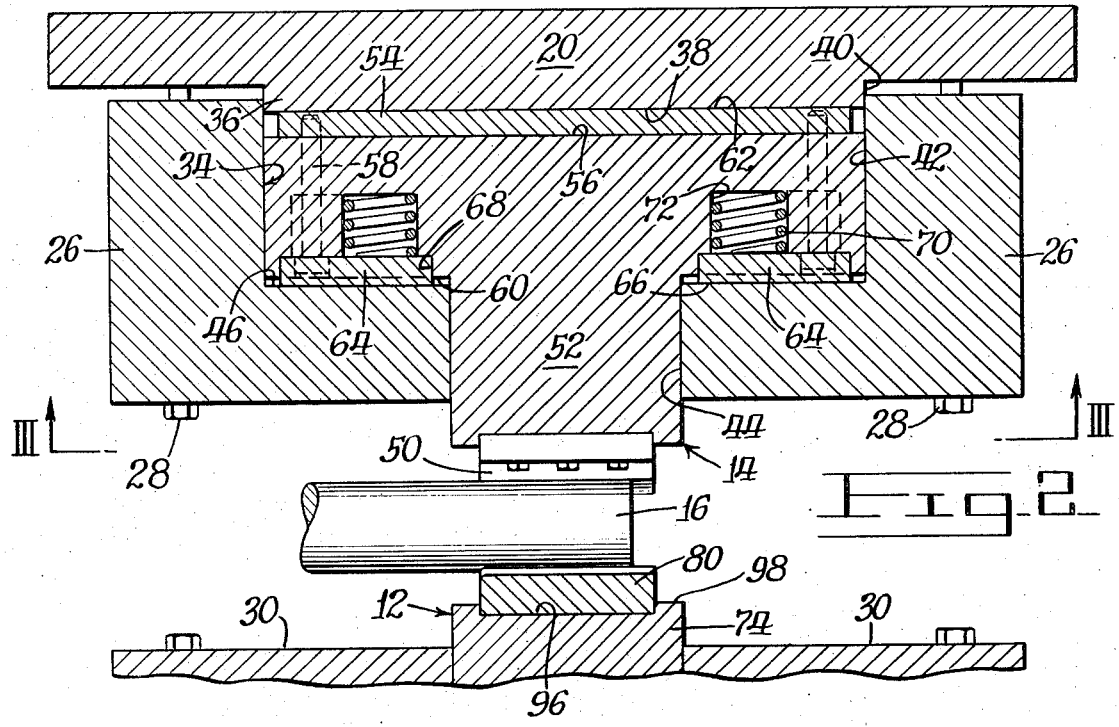
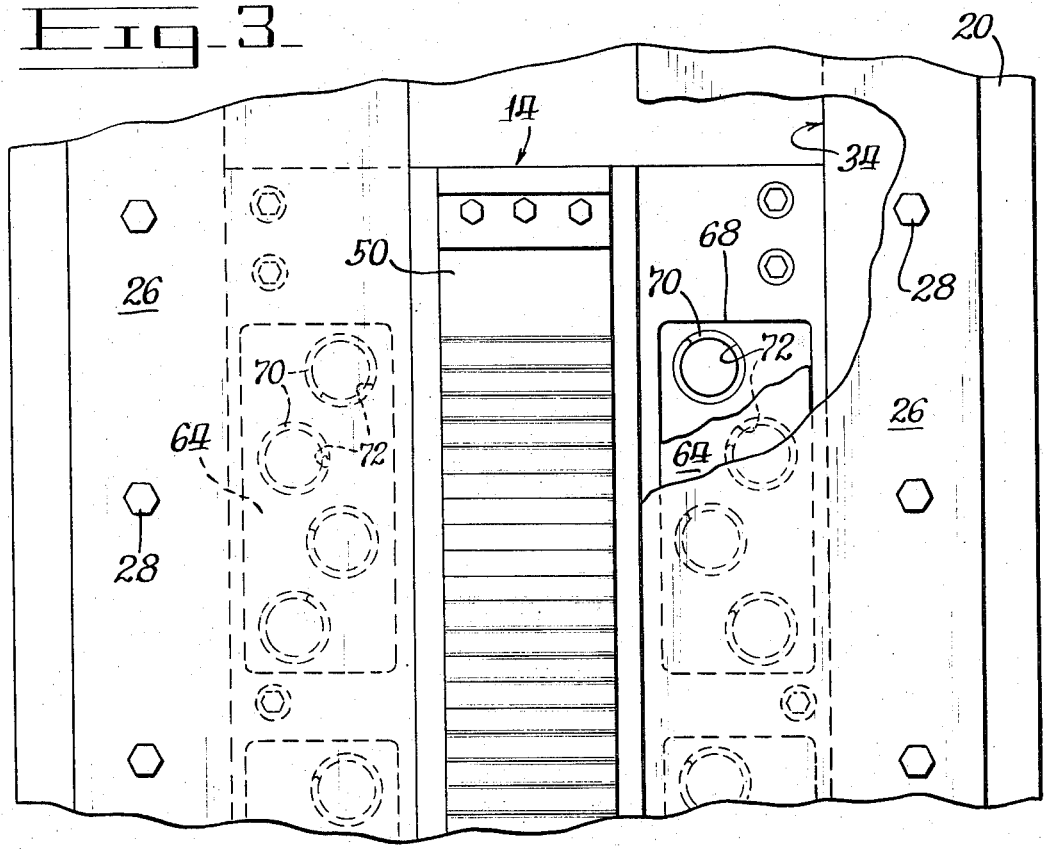

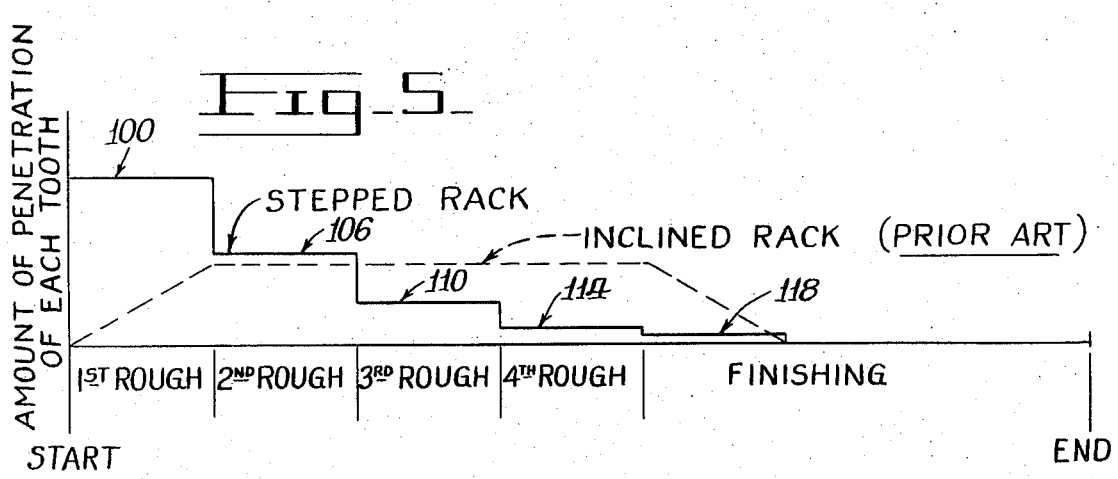
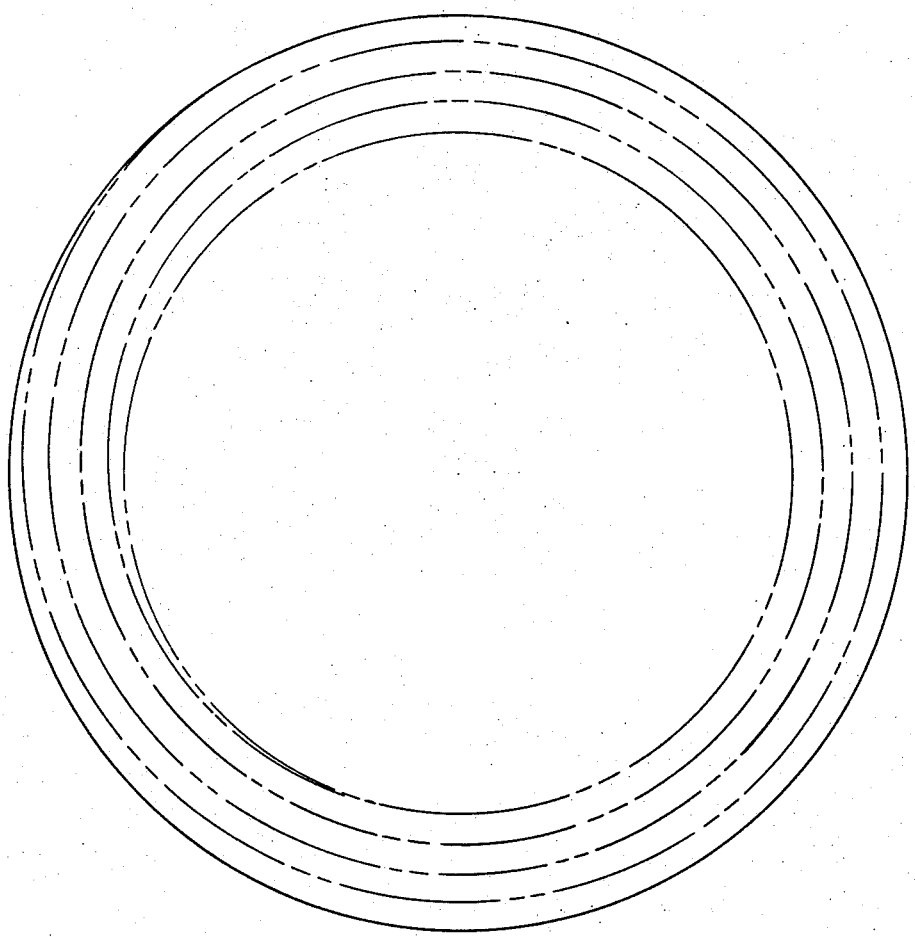

TOOTH FORMING MACHINE

BACKGROUND OF THE INVENTION

Tooth forming machines which displace metal through a cold forming process are capable of producing a finished part more economically than traditional methods of removing metal through cutting or machining action as in conventional hobbing machines, for example. The cold forming process also results in formed parts having substantially increased strength. Typical cold rolling machines which form splines, serrations, and similar teeth by rolling a cylindrical workpiece between dies moving in opposite directions are described in U.S. Pat. No. 2,994,237 to H. Pelphrey; U.S. Pat. No. 2,995,964 to J.C. Drader; and U.S. Pat. No. 3,015,243 to J.C. Drader.

With the production of relatively large splines, for example, those having a diameter of 3 inches or more, the components of the tooth forming machine necessarily become heavier and, due to the increased forming forces necessary, it has been found difficult to maintain product uniformity during extended forming operations.

Pairs of elongated racks or dies are used to produce a particular part and it is desirable that each set of racks normally produce several thousand splines or the like before regrinding of the racks is required. The roughing teeth on such prior art racks are designed with an inclined tooth height from the starting end toward the finishing end of the rack. The racks have a relatively deep level of tooth penetration into the cylindrical piece part, particularly with respect to the more steeply inclined or sharply pointed rack teeth adjacent to their finishing ends. Thus, conventional inclined racks with their inclined or progressive tooth design experience excessive stress risers and accompanying cracking of the teeth thereof through fatigue-type failures. Since these racks cost up to several thousand dollars, failures are extremely costly. This problem has tended to detract from expanded use of this forming method, particularly for the larger diameter forming jobs.

The elongated racks are mounted on upper and lower powered slide members reciprocably disposed in guiding channels of a machine frame with a cylindrical workpiece being rotatably supported therebetween. The racks move in opposite directions in tangential relation to the workpiece. The slide members are movable within the frame upon outwardly disposed bearing plates which absorb the relatively high outwardly directed forces required to form the teeth. It has been found that the upper slide member tends to rock slightly within its guide channel as the rack traverses the piece part. This is due to the substantial weight of the end of the rack which is cantilevered from the highly loaded area just above the workpiece with movement being permitted by the clearance between the bearings and the adjacent guide surfaces. This clearance tends to increase with usage of the machine incident to bearing plate wear. The rocking rack movement causes errors in tooth spacing, involute profile, and lead which results in generally higher stresses on the teeth of the workpiece during their subsequent use in an operational environment.

SUMMARY AND OBJECTS OF THE INVENTION

An object of the present invention is to provide a forming machine capable of producing parts at a lower unit cost and with greater accuracy than conventional forming machines.

Another object of the invention is to provide such a forming machine which affords substantially increased service life.

A further object of the invention is to provide a forming machine incorporating a support structure which allows more closely controlled tolerances between it and the individual forming components of the machine.

Still another object is to provide a machine slide assembly for maintaining accurate alignment between relatively movable components.

Other objects and advantages of the present invention will become more readily apparent upon reference to the accompanying drawings and following description.

BRIEF DESCRIPTION OF THE DRAWINGS

FIG. 2 is a view of the tooth forming machine of the present invention taken along section line II—II of FIG. 1.

FIG. 3 is a view taken along section line III—III of FIG. 2.

FIG. 5 is a graph of tooth penetration levels versus the length of the rack showing in solid lines the sequentially stepped nature of the tooth forming die of the present invention in comparison with the prior art inclined rack design shown in broken lines.

FIG. 6 is an enlarged end view of a cylindrical workpiece illustrating periodic penetration levels produced with a prior art inclined rack.

DESCRIPTION OF THE PREFERRED EMBODIMENT

Figure 1:
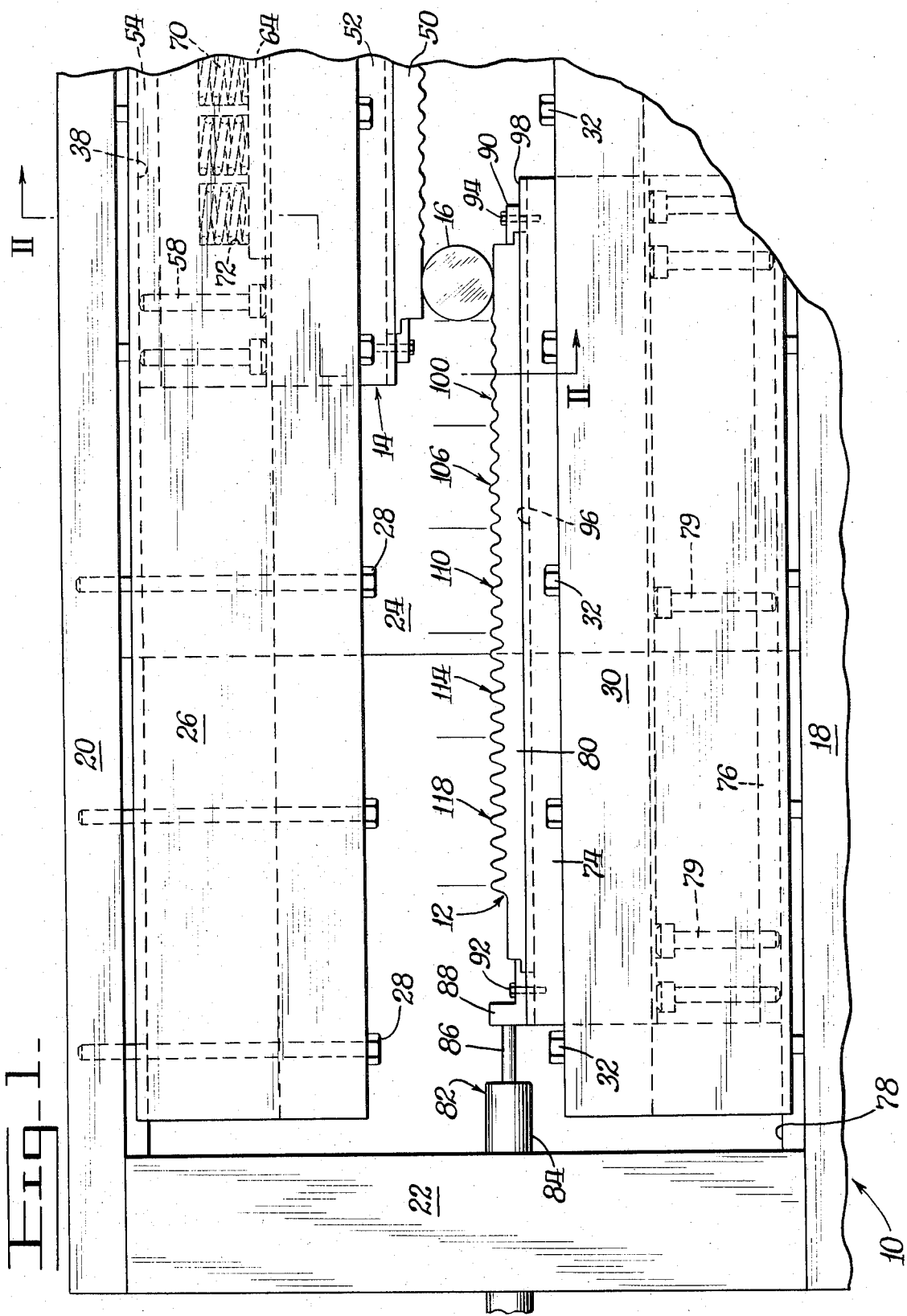
FIG. 1 is a side elevational view of a tooth forming machine with portions thereof removed for illustrative convenience.

Referring to the drawings and particularly to FIG. 1, a forming machine 10 includes a lower tool assembly 12 and an upper tool assembly 14 which are shown in an initial tangential gripping relationship with respect to a cylindrical workpiece 16. The tooth forming machine includes relatively heavy and rigid frame members comprising a lower bed plate 18, an upper bed plate 20, a pair of end walls 22 and a pair of side frames 24, only one of each of these pairs being shown. The cylindrical workpiece is rotatably supported on stationary locating centers or suitable cradles (not shown) which are adjustably mounted on the side frames 24 of the tooth forming machine.

As shown also in FIGS. 2 and 3, a pair of L-shaped upper keeper bars 26 with their legs inwardly disposed are secured to the elongated upper bed plate 20 through a plurality of upwardly extended bolts 28. In a similar manner, a pair of L-shaped lower keeper bars 30 are secured to the lower bed plate 18 through a plurality of elongated retaining bolts 32. Each pair of keeper bars and corresponding bed plates defines a similar, but oppositely oriented, T-shaped cavity shown generally by reference numeral 34, only the upper one of which will be hereinafter described in detail.

As shown in FIG. 2, the upper bed plate 20 has a depending land 36 having a bottom guide surface 38 and side surfaces 40. The keeper bars 26 have inwardly disposed upper side surfaces 42 in contact with the surfaces 40 of the bed plate and a pair of inwardly disposed lower side surfaces 44. A pair of upper ledge or guide surfaces 46 on the keeper bars 26 cooperate with the surfaces 42 and 44 and the surface 38 of the bed plate to define the upper T-shaped cavity 34.

The upper tool assembly 14 includes a tooth forming die or rack 50, a powered slide member 52, and a bearing plate 54 which is removably secured to a top surface 56 of the slide member by a plurality of bolts 58. The bolts 58 are countersunk into ledge surfaces 60 of the slide member, and the slide bearing 54 has an upper surface 62 which is in facing, sliding engagement with the surface 38 of the upper bed plate.

The powered slide member 52 of the present invention, which may weigh as much as approximately 1,500 pounds for some of the larger spline rolling applications, rests on the upper ledge surfaces 46 of the keeper bars 26 through a plurality of intermediate bearing plates or shoes 64 having a lower surface 66. As noted in both FIGS. 2 and 3, each of the bearing shoes 64 is disposed in a downwardly facing pocket 68 and is biased by a plurality of coil springs 70 contained within a corresponding plurality of depending cylindrical cavities 72 in the slide member.

While a full transverse section of the lower tool assembly 12 is not shown, it includes lower keeper bars 30 and a lower slide member 74 which are similar to the upper section. The lower tool assembly is different, however, in that it is movable on only a lower slide bearing 76 with respect to an upper surface 78 of the bed plate 18, as shown in FIG. 1. The lower slide bearing is removably secured to the underside of the lower slide member by a plurality of retaining bolts 79.

The bearing shoes 64 and the upper and lower slide bearings 54 and 76 are preferably of bronze to withstand the high unit loading encountered. Additionally, a lubrication system (not shown) introduces lubricant into the stationary member of the machine, such as at the upper bed plate 20 and the upper keeper bars 26, so that the associated guide surfaces 38 and 46 are lubricated to minimize relative wear between the sliding surfaces.

The lower tool assembly 12, including a lower tooth forming die or rack 80 and the lower slide member 74, is transversely and tangentially moved with respect to the workpiece 16 by an actuating cylinder system shown generally at 82 and having a cylinder portion 84 and an extendible piston rod 86 secured to a bracket 88. The bracket 88 and a counterpart bracket 90 at the rightward end of the rack are removably secured to the lower slide member by a plurality of bolts 92 and 94, respectively. The brackets 88 and 90 further serve to longitudinally retain the lower tooth forming rack in a longitudinal groove 96 defined within an upper surface 98 of the slide member 74 as shown also in FIG. 2.

The upper tool assembly 14 also includes an actuating cylinder system (not shown) connected thereto in a similar manner. These powered actuating cylinder systems are effective to move the upper and lower tool assemblies simultaneously in opposite directions as is described for example, in the above-mentioned U.S. Pat. No. 3,015,243 to J.C. Drader.

Figure 4:
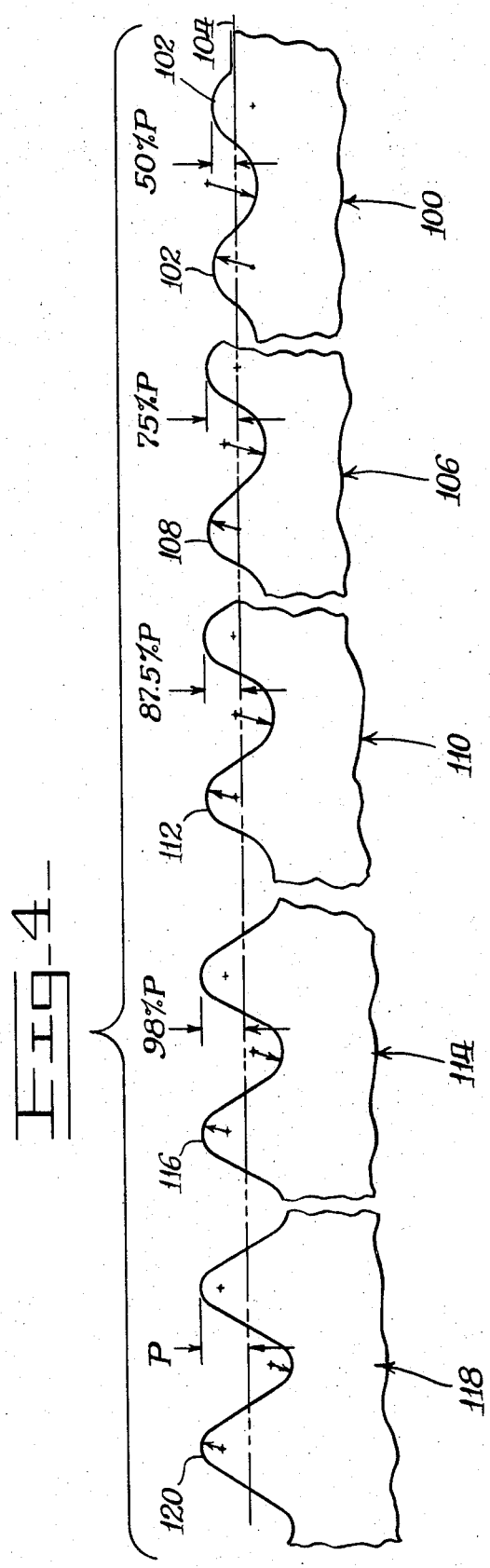
FIG. 4 is an enlarged fragmentary view of individual tooth sections of the tooth forming die of FIG. 1 showing their sequentially stepped relation in profile.

Both of the racks 50 and 80 of the subject invention have a discreet series of orderly steps in the tooth configuration, as may be seen in FIGS. 1 and 4, which greatly increase the service life of the dies.

A first roughing section of the die 80 is shown generally at 100. The first roughing section 100 has a length equivalent to half of the rolling circumference of the workpiece 16, or a whole multiple thereof. As shown more clearly by the enlarged fragmentary view at the right side of FIG. 4, a plurality of similarly shaped teeth 102 extend upwardly from a pitch line 104. These rather blunt teeth provide an initial penetration into the workpiece of approximately 50 percent, for example, of the total finish tooth penetration, as shown by the designation 50% P in FIG. 4.

A second roughing section of the die 80, indicated generally by the reference numeral 106, has a length similar to that of the first roughing section 100. The second roughing section includes a plurality of teeth 108 providing an additional penetration into the workpiece of approximately 25 percent, for example, or a cumulative penetration of 75 percent. While both the tips and roots of the teeth 108 exhibit substantially increased curvature, the amount of additional penetration has been appreciably reduced.

A third roughing section, indicated generally by the reference numeral 110, has a plurality of teeth 112 providing an additional penetration into the workpiece of approximately 12.5 percent, or a cumulative penetration of approximately 87.5 percent.

A fourth roughing section, indicated generally by the reference numeral 114, includes a plurality of teeth 116 providing an additional penetration of the order of 10.5 percent of the total finish tooth penetration.

Lastly, a finishing section indicated generally by the reference numeral 118, and including a plurality of teeth 120, serves to substantially complete the total penetration by an additional finishing penetration of approximately 2 percent, for example of the total tooth penetration designated by the symbol "P". Finishing section 118 has a length preferably two times or more in even multiples of half the rolling circumference of the workpiece so that a relatively smooth, or coining type finish can be applied to the final teeth formed on the workpiece. The relatively straight-sided teeth 120 provide a finished involute type of spline on the periphery of the workpiece through a generated deformation action.

The upper tooth forming die 50 is identical in profile to the lower rack 80 so that the workpiece teeth are diametrically and simultaneously formed by similar stepped teeth by both dies.

OPERATION

While the construction and operation of the present invention are believed clearly apparent from the foregoing description, further amplification will subsequently be made in the following brief summary of such operation. As the racks 50 and 80 are simultaneously and oppositely moved from the positions shown in FIG. 1, the freely rotatable workpiece 16 is caused to rotate in a counterclockwise manner and the tips of the teeth 102 of the first roughing section 100 penetrate into the workpiece to form the tooth roots thereof by metal displacement. Both racks, moved by their corresponding actuating systems 82, travel preferably a distance equal to 180 degrees rotation of the workpiece to generate teeth on the full periphery of the workpiece. Throughout this period of travel, both racks and the workpiece are exposed to substantially uniform stresses because the rather blunt profile of the forming teeth 102 does not change.

Figure 7:
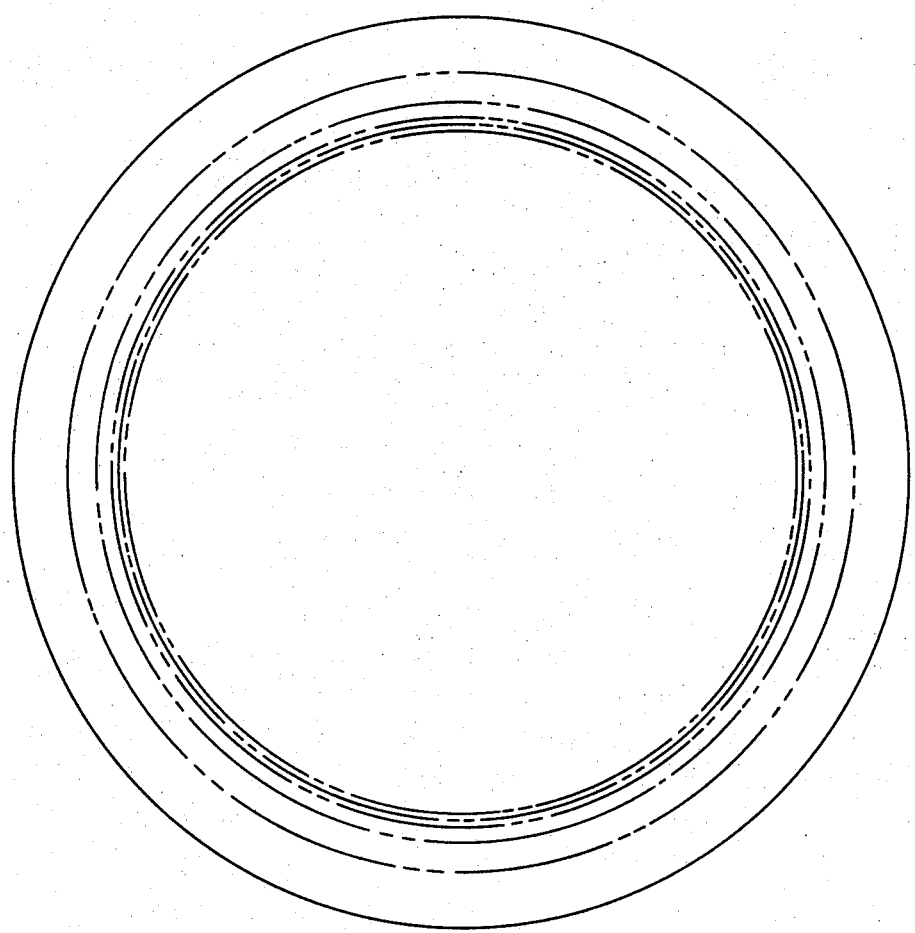
FIG. 7 is an enlarged end view of a cylindrical workpiece illustrating the sequential tooth forming penetration levels produced with the stepped rack of the subject invention.

Continued powering of both of the racks on the slide members 52 and 74 a distance equivalent to a similar 180 degree rotation of the workpiece results in the forming of the teeth on the full circumference thereof in a generated relationship to the profile of the teeth 108 on the second roughing section 106. As shown schematically in FIG. 7, these two successive steps result in tooth profiles being uniformly generated on the workpiece in a concentric and cylindrical manner when compared with the axis of the workpiece. The phantom lines shown in FIG. 7 represent the maximum penetration levels established by the various sections of the stepped rack. As is shown also in the graph of FIG. 5, the amount of the penetration of each of the teeth in the second roughing section 106 is approximately half that produced by the teeth of the first roughing section 100. This scheduling is important in controlling the maximum stresses imposed on both racks, especially during the latter stages of the major portion of the tooth forming operation.

The teeth 112 of the third roughing section 110 penetrate even less into the piece to be formed, such as for example half that of each tooth 108 as the racks travel a corresponding distance. Again, the stresses are minimized by decreasing in stepped increments the amount or depth of penetration of the forming teeth from one section to the next, which corresponds well with the rack profile change to a more pointed tooth form.

The teeth 116 of the fourth roughing section 114 penetrate proportionately less. Thus, because of this discreet series of orderly penetration levels, stress adjacent the roots of the teeth in the racks of the subject invention are generally designed to be minimized toward the end of the major tooth forming portion of the rack. With less tooth penetration near the end of the forming operation, there is generally less material movement on the workpiece and less loading of the teeth of the die which are deeper and have larger areas of contact with surfaces being deformed on the workpiece. It is further noted that the previously deformed material is more resistant to further deformation since it has been work-hardened in the earlier forming stages.

To summarize the toothed configuration of the racks, it may be noted from FIG. 4 that all of the teeth along the length of the rack are characterized by equal linear pitch, equal space width along the pitch line and substantially equal pressure angles.

Further, the teeth of each section are successively deeper in accordance with the preceding description. The stepped relation between the various sections may also be characterized by the location of the center of radius for the tips of each tooth and the roots between each adjacent pair of teeth. In the section 100, the centers of radius for the tips are located on the root side of the pitch line 104 as may be seen in FIG. 4. The center of radius for the tips of each successive section are arranged progressively toward the tip side of the pitch line so that the center of radius for the tips of the finishing section 118 are approximately equidistant between the pitch line and the tips. Conversely, the centers of radius for the roots in the initial roughing section are located on the tip side of the pitch line with the centers of each successive section being arranged progressively toward the root side. In the initial roughing section, the roots might be flat so that the center of radius would be located at an infinite distance on the tip side of the pitch line. However, for the subsequent roughing sections a curved configuration is preferred for the roots as shown in FIG. 4.

This is in marked contrast to the tooth forming structure of the prior art racks which have an inclined tooth height and which provide the tooth forming penetration levels schematically represented by the phantom lines shown in FIG. 6. As such a conventional inclined rack is moved leftwardly with respect to a workpiece a distance equal to 180° rotation of the workpiece, a progressively penetrating tooth height is realized as represented schematically by the spiral form of curve shown. This initial progressive penetration level of prior art racks is also represented by the upwardly sloped broken line shown in FIG. 5. If such a rack is moved further leftwardly a similar distance, the amount of tooth penetration is retained at a predetermined maximum amount represented by the horizontal broken line shown in FIG. 5. However, the tips of the die teeth continue to penetratingly form a spiral type of curve in the cylindrical workpiece such that if the workpiece were removed at this stage, the periphery of the workpiece would not be cylindrical but would be relatively deformed. In order to regain the cylindrical shape, it is necessary for the teeth of the prior art inclined racks to be held to a given height at their finishing end, as shown by the downwardly sloped broken line trace on the right side of FIG. 5. It may thus be appreciated that because the amount of tooth penetration in conventional racks is relatively high throughout the major portion of the tooth forming operation, the stresses in these racks are generally excessive at the latter stages thereof.

On the other hand, the service life of the dies of the subject invention is greatly increased because the fatigue failure problem is substantially eliminated through sequentially stepping the tooth heights in the decreasing manner provided by the present invention. It should further be appreciated that the stepped relation of each die can be varied from the percentage penetration levels set forth above to suit the particular requirements of specific job applications. For example, the first set of teeth corresponding to the first roughing section 100 of FIG. 4, will usually provide for approximately 40–60 percent penetration. The final set of teeth or finishing section 118 must necessarily provide for cumulative penetration of 100 percent while a preceding set of teeth such as the fourth roughing section of FIG. 4 will provide for cumulative penetration in the approximate range of 95–98 percent in order to permit proper finishing. One or more additional sections may be employed after the first roughing section depending primarily upon the material of the workpiece and the overall depth of penetration desired.

As the teeth on the workpiece are formed, the powered lower tool assembly 12 experiences a downward force by such loading which corresponds to the direction of natural gravity so that only the lower bearing 76 is needed for slidably supporting it, as mentioned above. But the upper tool assembly 14 is forced upwardly by the forming forces in a direction opposite to that of natural gravity acting on the rack 50, the upper slide member 52, the upper slide bearing 54, and other related parts of the upper tool assembly. When the workpiece is under either end of the rack, it may be appreciated that the high weight of these components tends to swing the opposite or non-supported end downwardly. To counter this rocking tendency, the springs 70 act on the plurality of bearing shoes 64 for improved support of the upper tool assembly. The biasing force of the springs tends to counteract gravitational forces at the end of the rack away from the workpiece and holds the upper slide bearing 54 substantially against the lower surface 38 of the upper bed plate 20 for the full length of travel of the tool assembly.

In view of the foregoing, it is readily apparent that the structure of the present invention provides an improved tooth forming machine that is capable of producing tooth parts such as large diameter splines or the like at a reduced cost per piece part. It accomplishes this by extending the service life of the relatively expensive tooth forming dies by controllably decreasing the depth of penetration of the die forming teeth. Such structure further allows improved quality parts to be produced because of the superior manner of resiliently and slidably supporting the upper tool assembly.

While the invention has been described and shown with particular reference to the preferred embodiment, it will be apparent that variations might be possible that would fall within the scope of the present invention, which is not intended to be limited except as defined in the following claims.

What is claimed is:

1. A tooth forming machine for selectively deforming a rotatably supported cylindrical workpiece, comprising:
    a housing,
    a powered member slidably mounted on said housing for movement substantially transversely of such a workpiece,
    forming die means mounted on said powered member in tangential tooth forming relation with the periphery of said workpiece and including a stepped series of tooth forming sections thereon, the teeth in the successive sections being formed with tips and roots of selectively varied curvature providing decreasing penetrating levels and substantially equal penetration forces for each successive section, said die means including a plurality of teeth of uniform profile within each section of said stepped series, and
    wherein said stepped series of tooth forming sections on said die means comprises a plurality of roughing sections providing relatively deep penetration into the workpiece and a finish section affording relatively limited further penetration into the workpiece, the first roughing section providing for approximately 40–60 percent penetration and a final roughing section providing for approximately 95–98 percent cumulative penetration, at least one additional roughing section being arranged between the first and final roughing sections.

2. The tooth forming machine of claim 1 wherein said stepped series of tooth forming sections on said racks comprises a plurality of roughing sections, each having a length corresponding to a whole multiple of 180° rotation for said workpiece, and wherein the centers of radius for tooth tips of the initial section are disposed on the root side of a pitch line for the teeth of each rack, the centers of radius for the tooth tips of each successive section progressing toward the tip side of the pitch line, the centers of radius for tooth roots of the initial section being disposed on the tip side of the pitch line, the centers of radius for the tooth roots of each successive section progressing toward the root side of the pitch line.

3. A tooth forming machine for forming a plurality of teeth on a rotatably supported cylindrical workpiece, comprising;
    a housing having horizontally extending upper and lower guide surface means defined thereon,
    a pair of powered slide members respectively movable along said guide surface means transversely of the workpiece,
    a plurality of spring biased bearing plates interacting between the upper guide surface means and the respective slide member to maintain alignment therebetween,
    a pair of tooth forming racks mounted on said pair of slide members for movement in opposite directions in tangential and penetrating relation with the periphery of said workpiece,
    a stepped series of tooth forming sections on said pair of racks of gradually decreasing penetration levels with respect to said workpiece, a plurality of teeth of uniform profile being within each section of said stepped series, said stepped series of tooth forming sections on said racks comprising a plurality of roughing sections, each having a length corresponding to a whole multiple of 180° rotation for said workpiece, and wherein the centers of radius for tooth tips of the initial section are disposed on the root side of a pitch line for the teeth of each rack, the centers of radius for the tooth tips of each successive section progressing toward the tip side of the pitch line.

4. The tooth forming machine of claim 3 wherein the centers of radius for tooth roots of the initial section are disposed on the tip side of the pitch line, the centers of radius for the tooth roots of each successive section progressing toward the root side of the pitch line.

5. A tooth forming machine for rolling a plurality of teeth onto a rotatably supported cylindrical workpiece, comprising;
    a housing having horizontally extending upper and lower guide surface means defined thereon in upwardly facing relation, a pair of powered slide members respectively movable along said guide surface means tranversely of the workpiece,
    a plurality of spring biased bearing plates interacting between the upper guide surface means and the respective slide members to maintain alignment therebetween, the upper slide member also having an upwardly facing bearing surface arranged in sliding engagement with a surface of the housing, and
    a pair of tooth forming racks mounted upon said slide members for movement in opposite directions in tangential and penetrating relation with the workpiece.

* * * * *